(12) United States Patent
Huang et al.

(10) Patent No.: US 11,747,251 B2
(45) Date of Patent: Sep. 5, 2023

(54) SYSTEMS AND METHODS FOR CHARACTERIZING POROELASTIC MATERIALS

(71) Applicant: Georgia Tech Research Corporation, Atlanta, GA (US)

(72) Inventors: Haiying Huang, Atlanta, GA (US); Ming Liu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 357 days.

(21) Appl. No.: 17/048,670

(22) PCT Filed: Apr. 17, 2019

(86) PCT No.: PCT/US2019/027886
§ 371 (c)(1),
(2) Date: Oct. 19, 2020

(87) PCT Pub. No.: WO2019/204452
PCT Pub. Date: Oct. 24, 2019

(65) Prior Publication Data
US 2021/0033508 A1 Feb. 4, 2021

Related U.S. Application Data

(60) Provisional application No. 62/658,840, filed on Apr. 17, 2018.

(51) Int. Cl.
*G01N 3/42* (2006.01)
*G01N 3/02* (2006.01)

(52) U.S. Cl.
CPC .............. *G01N 3/42* (2013.01); *G01N 3/02* (2013.01)

(58) Field of Classification Search
CPC .......... G01N 3/42; G01N 3/02; G01N 29/043; G01N 24/081; G01N 15/082; G01N 3/00;
(Continued)

(56) References Cited

U.S. PATENT DOCUMENTS 7,454,960 B2 * 11/2008 Ernst .................. G01N 3/42
73/78
8,074,497 B2 * 12/2011 Sawa .................. G01N 3/42
73/81
(Continued)

OTHER PUBLICATIONS

International Search Report and Written Opinion from Application No. PCT/US2019/027886 dated Jul. 15, 2019 (8 pages).
(Continued)

*Primary Examiner* — Brandi N Hopkins
(74) *Attorney, Agent, or Firm* — Troutman Pepper Hamilton Sanders LLP; Ryan A. Schneider; Dustin B. Weeks (57) ABSTRACT

Disclosed herein are systems and methods for characterizing poroelastic materials. Indentation of a poroelastic solid by a spherical-tip tool is analyzed within the framework of Biot's theory. The present disclosure provides the response of the indentation force as well as the field variables as functions of time when the rigid indenter is loaded instantaneously to a fixed depth. Some embodiments of the present disclosure consider the particular case when the surface of the semi-infinite domain is permeable and under a drained condition. Compressibility of both the fluid and solid phases is taken into account. The solution procedure based on the McNamee-Gibson displacement function method is adopted.

21 Claims, 8 Drawing Sheets

(58) Field of Classification Search
CPC ........ G01N 23/046; G01N 3/08; G01N 33/24; G01N 3/40; G01N 15/00; G01N 3/32; G01N 33/48792; G06F 17/5018; G06F 30/20; G06F 30/27; G06F 30/23; B29C 45/7693; E21B 43/00; E21B 49/00; E21B 49/008; B63B 71/10; G01V 9/005; Y02T 90/00
See application file for complete search history.

(56) References Cited

U.S. PATENT DOCUMENTS

| | | | | |
|---|---|---|---|---|
| 9,046,456 | B2* | 6/2015 | Furuta | G01N 3/42 |
| 10,024,774 | B2* | 7/2018 | Koshimizu | G01N 3/42 |
| 2003/0060987 | A1 | 3/2003 | Dao et al. | |
| 2009/0056427 | A1 | 3/2009 | Hansma et al. | |
| 2009/0289627 | A1 | 11/2009 | Johansen et al. | |
| 2016/0069182 | A1 | 3/2016 | Neale et al. | |
| 2017/0204726 | A1 | 7/2017 | Lecampion et al. | |

OTHER PUBLICATIONS

Chan, et al., "Spherical Indentation Testing of Poroelastic Relaxations in Thin Hydrogel Layers," Dec. 6, 2011 In: Soft Matter (URL: https://pubs.rsc.org/en/content/articlelanding/2012/sm/c1sm06514a/unauth#!divAbstract>.

Hu, et al., "Using Indentation to Characterize the Poroelasticity of Gels," 2010 In: Appl. Phys. Lett. 96, 121904 (URL: https://aip.scitation.or/doi/10.1063/1.3370354>.

Langlois, et al., "Method for the Mechanical Characterization of Poroelastic Materials," 2000 In: Canadian Acoustics 83, vol. 28 No. 3.

* cited by examiner

SYSTEMS AND METHODS FOR CHARACTERIZING POROELASTIC MATERIALS

CROSS-REFERENCE TO RELATED APPLICATIONS

This application claims the benefit of U.S. Provisional Patent Application No. 62/658,840, filed 17 Apr. 2018, the entire contents and substance of which is incorporated herein by reference in its entirety as if fully set forth below.

FIELD OF THE DISCLOSURE

The present disclosure relates generally to characterization of solid materials. Particularly, embodiments of the present disclosure relate to systems and methods for characterizing poroelastic materials.

BACKGROUND

The process of indentation by a rigid tool has been widely studied for its versatility as an experimental technique to probe constitutive properties of materials of various kinds across multiple scales. Recently, spherical indentation has been applied to characterize poroelasticity of fully saturated porous media, such as polymeric gels and hydrated bones, via either displacement- or force-controlled tests. In a displacement-controlled load relaxation test, the indenter is pressed instantaneously to a fixed depth and held until the indentation force approaches a horizontal asymptote, whereas in a step force loading or ramp-hold test, the indentation force is kept constant after reaching a prescribed level. In theory, for a step loading test, if both the solid and fluid phases can be considered incompressible, elastic constants can be determined from the early and late time responses, while the hydraulic diffusivity can be obtained form the transient response. In the literature, only a few cases of poroelastic contact problems have been investigated theoretically and have been treated as incompressible. Additionally, the methods provide difficulties in solving the complex equations, such as evaluating integrals with rapid oscillation.

What is needed, therefore, is an improved material characterization technique to take into account the compressibility of both the fluid and solid phases while overcoming the mathematical difficulties presented by the prior art. Embodiments of the present disclosure address this need as well as other needs that will become apparent upon reading the description below in conjunction with the drawings.

BRIEF SUMMARY OF THE INVENTION

The present invention relates to systems and methods for characterizing poroelastic materials. An exemplary embodiment of the present invention can provide a method for characterizing poroelastic materials, comprising: obtaining experimental data for a material, comprising at least: time data and indentation force data; indicating a first asymptote of the indentation force data at a corresponding first time from the time data; indicating a second asymptote of the indentation force data at a corresponding second time from the time data; selecting a corresponding master curve from a plurality of theoretical master curves based on the ratio of the first and the second asymptotes; and calculating a value for a property of the material by matching the experimental data with the corresponding master curve.

In any of the embodiments disclosed herein, the material can be a poroelastic solid.

In any of the embodiments disclosed herein, the obtaining the experimental data can comprise: indenting, with an indentation tool, the poroelastic solid to a predetermined indentation depth; measuring a force required to maintain the indentation tool at the indentation depth to obtain the indentation force data; and recording the indentation force data with respect to the corresponding time data.

In any of the embodiments disclosed herein, the indentation tool can comprise a rigid smooth sphere.

In any of the embodiments disclosed herein, the rigid sphere can be selected from the group consisting of: permeable indenters and impermeable indenters.

In any of the embodiments disclosed herein, the drainage condition on the surface of the poroelastic solid can be selected from the group consisting of: a permeable indenter on a fully permeable surface, a permeable/impermeable indenter on a fully impermeable surface, and an impermeable indenter on a fully permeable surface.

In any of the embodiments disclosed herein, the first time from the time data can be an initial time, wherein the indentation force reaches a maximum.

In any of the embodiments disclosed herein, the second time from the time data can be an ending time.

In any of the embodiments disclosed herein, the desired material property can be the coefficient of hydraulic diffusion.

In any of the embodiments disclosed herein, the experimental data can comprise at least a force relaxation behavior.

In any of the embodiments disclosed herein, the determining a corresponding master curve can comprise: calculating a constant comprising the ratio of the first and the second asymptotes; and selecting a corresponding master curve from a theoretical solution corresponding to the value of the constant and the drainage condition of the contact surface.

In any of the embodiments disclosed herein, the calculating the value of the property of the material can comprise fitting, using a fitting function predetermined by the full poroelastic solution, the experimental data to the corresponding master curve to obtain the value of the property of the material.

In any of the embodiments disclosed herein, the plurality of master curves can be obtained by: establishing one or more governing equations; establishing one or more boundary conditions using Heaviside step displacement loading; transforming the one or more governing equations using Hankel transform in the Laplace domain to find the expressions for the two displacement functions in terms of integrals with three unknowns; transforming the one or more boundary conditions to the Laplace domain and matching the boundary conditions with the field quantities expressed through the displacement functions to obtain three equations for the three unknowns, which includes one or more Fredholm integral equations of the second kind; providing alternate integral expressions for the integral kernels in the Fredholm integral equations using one or more modified Struve functions; solving the Fredholm integral equations using a method of successive substitution; calculating a time domain solution by numerically inverting the solved Laplace domain equation; and integrating, based on a plurality of parameters of a specific poroelastic material, the time domain solution to obtain a plurality of master curves representing force relaxation.

In any of the embodiments disclosed herein, the one or more governing equations can be obtained from one or more McNamee-Gibson displacement function methods.

In any of the embodiments disclosed herein, the one or more governing equations can comprise one or more material constants.

In any of the embodiments disclosed herein, the expressions of one or more field quantities can comprise the displacement function solutions from the one or more governing equations.

Another embodiment of the present disclosure can provide a system for characterizing poroelastic materials, comprising: an indentation tool, comprising a rigid smooth sphere; one or more force sensors; one or more processors; and at least one memory storing instructions that when executed by the one or more processors, cause the system to: indent, with the indentation tool, a material to a predetermined indentation depth; measure, using the one or more force sensors, a force required to maintain the indentation tool at the indentation depth to obtain indentation force data; record experimental data for the material, comprising at least: indentation force data and time data corresponding to the indentation force data; indicate a first asymptote of the indentation force data at a corresponding first time from the time data; indicate a second asymptote of the indentation force data at a corresponding second time from the time data; select a corresponding master curve from a plurality of theoretical master curves based on the ratio of the first and the second asymptotes; and calculate a value for a property of the material by matching the experimental data with the corresponding master curve.

In any of the embodiments disclosed herein, the material can be a poroelastic solid.

In any of the embodiments disclosed herein, the rigid sphere can be selected from the group consisting of: permeable indenters and impermeable indenters.

In any of the embodiments disclosed herein, the drainage condition on the surface of the poroelastic solid can be selected from the group consisting of: a permeable indenter on a fully permeable surface, a permeable/impermeable indenter on a fully impermeable surface, and an impermeable indenter on a fully permeable surface.

In any of the embodiments disclosed herein, the first time from the time data can be an initial time, wherein the indentation force reaches a maximum.

In any of the embodiments disclosed herein, the second time from the time data can be an ending time.

In any of the embodiments disclosed herein, the desired material property can be the coefficient of hydraulic diffusion.

In any of the embodiments disclosed herein, the experimental data can comprise at least a force relaxation behavior.

In any of the embodiments disclosed herein, the determining a corresponding master curve can comprise: calculating a constant comprising the ratio of the first and the second asymptotes; and selecting a corresponding master curve from a theoretical solution corresponding to the value of the constant and the drainage condition of the contact surface.

In any of the embodiments disclosed herein, the calculating the value of the property of the material can comprise fitting, using a fitting function predetermined by the full poroelastic solution, the experimental data to the corresponding master curve to obtain the value of the property of the material.

In any of the embodiments disclosed herein, the plurality of master curves can be obtained by storing instructions that when executed by the one or more processors, cause the system to: establish one or more governing equations; establish one or more boundary conditions using Heaviside step displacement loading; transform the one or more governing equations using Hankel transform in the Laplace domain to find the expressions for the two displacement functions in terms of integrals with three unknowns; transform the one or more boundary conditions to the Laplace domain and matching the boundary conditions with the field quantities expressed through the displacement functions to obtain three equations for the three unknowns, which includes one or more Fredholm integral equations of the second kind; provide alternate integral expressions for the integral kernels in the Fredholm integral equations using one or more modified Struve functions; solve the Fredholm integral equations using a method of successive substitution; calculate a time domain solution by numerically inverting the solved Laplace domain equation; and integrate, based on a plurality of parameters of a specific poroelastic material, the time domain solution to obtain a plurality of master curves representing force relaxation.

In any of the embodiments disclosed herein, the one or more governing equations can be obtained from one or more McNamee-Gibson displacement function methods.

In any of the embodiments disclosed herein, the one or more governing equations can comprise one or more material constants.

In any of the embodiments disclosed herein, the expressions of one or more field quantities can comprise the displacement function solutions from the one or more governing equations.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with current techniques for characterizing poroelastic materials is the mathematical difficulty of solving the complex systems of equations for including the compressibility of both solids and liquids. Improved solid characterization techniques can vastly improve the design space in industries such as drilling, failure analysis, geology, soil management, erosion control, and the like.

Indentation of a poroelastic solid by a spherical-tip tool can be analyzed within the framework of Biot's theory. Embodiments of the present disclosure seek the response of the indentation force as well as the field variables as functions of time when the rigid indenter is loaded instantaneously to a fixed depth. Three particular cases can be considered when the drainage condition of the surface of the semi-infinite domain is one of the following: 1) a permeable indenter on a fully permeable surface (case I or drained case), 2) a permeable/impermeable indenter on a fully impermeable surface (case II or undrained case), 3) an impermeable indenter on a fully permeable surface (case III or mixed case). Compressibility of both the fluid and solid phases can be taken into account.

Theoretical solutions for a poroelastic half space subjected to surface loading can be found for a few special cases. The McNamee-Gibson displacement function method has generally been employed to solve this class of problems. In the earlier literature, the constituents are treated as incompressible. McNamee and Gibson considered uniform mechanical loading along an infinite strip and over a circular area, respectively. While the McNamee-Gibson displacement function method provides a general solution procedure, one of the difficulties in solving this class of problems analytically is in evaluating integrals with oscillatory kernels over an unbounded interval. In the present disclosure, it is shown that such issues can be overcome by the use of a series of special functions.

Problem formulation and the solution procedure are first introduced. Solutions for the contact pressure and relaxation of the indentation force with time are shown.

In practice, governing equations for an axisymmetric full poroelastic problem in a half space ($z \geq 0$) can be written using the McNamee-Gibson displacement functions $\mathcal{D}$ and $\mathcal{F}$, namely, $$\frac{\partial}{\partial t}\nabla^2 \mathcal{D} = c\nabla^2\nabla^2 \mathcal{D} \quad (1)$$

$$\nabla^2 \mathcal{F} = 0 \quad (2)$$

where $$\nabla^2 = \frac{\partial^2}{\partial r^2} + \frac{1}{r}\frac{\partial}{\partial r} + \frac{\partial^2}{\partial z^2}$$

$$c = \frac{\kappa\left(K + \frac{4}{3}G\right)}{\left[\alpha^2 + S\left(K + \frac{4}{3}G\right)\right]\mu}$$

$$\alpha = 1 - \frac{K}{K_s}$$

$$S = \frac{n}{K_f} + \frac{\alpha - n}{K_s}$$

The following list of independent material constants can be used to describe the poroelastic process:
κ—permeability
μ—fluid viscosity
K—skeleton bulk modulus
G—skeleton shear modulus
n—porosity
$K_f$—fluid bulk modulus
$K_s$—solid bulk modulus Five derived material constants can be used to facilitate the derivation. In addition to the diffusivity coefficient, c, the Biot coefficient, α, and the storage coefficient, S, two other material constants η and ϕ, are defined as follows $$\eta = \frac{K}{2G} + \frac{2}{3}$$

$$\phi = \frac{\alpha^2 + S\left(K + \frac{4}{3}G\right)}{\alpha^2 + S\left(K + \frac{1}{3}G\right)}$$

Field variables such as the stresses, pore pressure and displacements can be directly expressed using the displacement functions $\mathcal{D}$ and $\mathcal{F}$, for example, $$\frac{\sigma_z}{2G} = -\nabla^2 \mathcal{D} + \frac{\partial^2 \mathcal{D}}{\partial z^2} - z\frac{\partial^2 \mathcal{F}}{\partial z^2} + \phi\frac{\partial \mathcal{F}}{\partial z} \quad (3)$$

where $\sigma_z$ is the vertical stress. Compression positive is adopted for the sign convention.

The general solutions for Eqs. 1 and 2 can be obtained by a Hankel transformation in the Laplace domain. After neglecting the terms unbounded at infinite, one can obtain, $$\overline{\mathcal{D}} = \int_0^\infty \left[ \begin{array}{c} A_1\exp(-z\xi) + \\ A_2\exp\left(-z\sqrt{\xi^2+\lambda}\right) \end{array} \right] J_0(r\xi)d\xi \quad (4)$$

$$\overline{\mathcal{F}} = \int_0^\infty B_1\exp(-z\xi)J_0(r\xi)d\xi \quad (5)$$

where $\lambda = s/c$ and s is the Laplace transform parameter. $A_1$, $A_2$ and $B_1$ are functions of $\xi$ and s to be determined through the boundary conditions. The overbar is used here to denote the functions in the Laplace domain.

Heaviside step displacement loading can be applied to the spherical-tip indenter. Conformity is assumed at the frictionless contact surface. It can be shown that if a sphere is pressed to a fixed depth in a poroelastic medium, the contact radius in fact changes with time. It is unclear whether such a problem with a free and moving boundary can be solved analytically. Here, the assumption is made that change in the contact radius is small and the contact radius a remains fixed and can be determined from $a=\sqrt{Rd}$, where d is the depth of penetration and R is the radius of the indenter.

The boundary conditions for the problem can be written in terms of surface displacement $u_z$, stresses $\sigma_z$, $\sigma_{zr}$ and pore pressure p:

|  | Case I | Case II | Case III |
|---|---|---|---|
| $0 \leq r \leq a_-$ | $u_z = \left(d - \dfrac{r^2}{2R}\right)\mathcal{H}(t)$ | $u_z = \left(d - \dfrac{r^2}{2R}\right)\mathcal{H}(t)$ | $u_z = \left(d - \dfrac{r^2}{2R}\right)\mathcal{H}(t)$ |
|  | $\sigma_{zr} = 0$, $p = 0$ | $\sigma_{zr} = 0$, $q_z = 0$ | $\sigma_{zr} = 0$, $q_z = 0$ |
| $r \geq a_+$ | $\sigma_z = \sigma_{zr} = 0$ $p = 0$ | $\sigma_z = \sigma_{zr} = 0$ $q_z = 0$ | $\sigma_z = \sigma_{zr} = 0$, $p = 0$ | where $\mathcal{H}(t)$ is the Heaviside step function.

Transformation of the non-trivial B.C. in the Laplace domains gives, $0 \leq r \leq a_-$ $$\overline{u}_z = \left(d - \dfrac{r^2}{2R}\right)s^{-1}$$

For Case I, matching the poroelastic fields with the boundary conditions in the Laplace domain can yield the following equations, $$A_1\xi + A_2\sqrt{\xi^2+\lambda} + B_1(1-\phi) = 0 \quad (6)$$

$$A_2\eta\lambda + B_1\xi[\phi + 2\eta(1-\phi)] = 0 \quad (7)$$

and a dual integral equation containing only the unknown $B_1$, $$\int_0^\infty B_1 J_0(r\xi)d\xi = (s\phi)^{-1}\left(\dfrac{r^2}{2R} - d\right) \quad (8)$$

$0 \leq r \leq a_-$ $$\int_0^\infty [1 + H(s,\xi)]\xi B_1 J_0(r\xi)d\xi = 0 \quad (9)$$

$r \geq a_+$ where $$H(s,\xi) = \omega\left(1 + 2\lambda^{-1}\xi^2 - 2\lambda^{-1}\xi\sqrt{\xi^2+\lambda}\right)$$

$$\omega = \dfrac{\phi + 2\eta(1-\phi)}{\phi(2\eta-1)}$$

Constant $\omega$ can be expressed explicitly using other material constants $$\omega = \dfrac{\alpha^2(1-2\nu)}{\alpha^2 + 2SG\dfrac{1-\nu}{1-2\nu}} \quad (10)$$

where $\nu$ is the drained Poisson's ratio. Since $0 \leq \alpha \leq 1$, $S \geq 0$, $G \geq 0$ and $0 \leq \nu \leq 0.5$, the theoretical range of $\omega$ is $[0,1]$. If both the fluid and solid phases are incompressible, $\omega$ reduces to a function of $\nu$ only, $\omega = 1-2\nu$.

It has been shown that the solution of a dual integral equation can be expressed by, $$B_1\xi^{\frac{1}{2}} = \sqrt{\dfrac{2}{\pi}}\left(\dfrac{1}{s\phi R}\right)\left[\int_0^a x^{\frac{1}{2}}(x^2 - Rd)J_{-\frac{1}{2}}(x\xi)dx + \int_a^\infty x\overline{\theta}(s,x)J_{-\frac{1}{2}}(x\xi)dx\right] \quad (11)$$

where $$J_{-\frac{1}{2}}(x\xi)$$

is the Bessel function of the first kind of order $-\frac{1}{2}$ and $\overline{\theta}(s,m)$ satisfies a Fredholm integral equation of the second kind.

For convenience, the following dimensionless variables are introduced, $$x_* = x/a \quad r_* = r/a \quad z_* = z/a$$

$$\xi_* = \xi a \quad s_* = \lambda a^2 \quad t_* = tc/a^2$$

Denote function $\bar{\theta}_1(s_*, x_*)$ as the normalized $\bar{\theta}(s, x)$, $$\bar{\theta}_1(s_*, x_*) = \bar{\theta}(s, x)a^{-\frac{3}{2}}$$

The Fredholm integral equation for $\bar{\theta}_1(s_*, x_*)$ is, $$\left[\begin{array}{c} \bar{\theta}_1(s_*, x_*) + \\ \omega \int_1^\infty N(s_*, x_*, m_*)\bar{\theta}_1(s_*, m_*)dm_* \end{array}\right] = \omega M(s_*, x_*) \quad (12)$$

where, $$N(s_*, x_*, m_*) = m_* \int_0^\infty \xi_* H_1(s_*, \xi_*) J_{-\frac{1}{2}}(x_*\xi_*) J_{-\frac{1}{2}}(m_*\xi_*) d\xi_*$$

$$M(s_*, x_*) = \int_0^1 m_*^{-\frac{1}{2}}(1 - m_*^2) N(s_*, x_*, m_*) dm_*$$

$$H_1(s_*, \xi_*) = \left(1 + 2s_*^{-1}\xi_*^2 - 2s_*^{-1}\xi_*\sqrt{\xi_*^2 + s_*}\right)$$

Eq. 12 can then be evaluated numerically, where $\bar{\theta}_1(s_*, x_*)$ is the unknown to be determined. As would be appreciated by one of ordinary skill in the art, so long as the dimensionless spatial and temporal coordinates $x_*$ and $t_*$ (or $s_*$ in the Laplace domain) are fixed, $\bar{\theta}_1(s_*, x_*)$ is influenced only through the derived material constant $\omega$.

Function $N(s_*, x_*, m_*)$ can be evaluated prior to finding the solution to Eq. 12. Though uniformly convergent, $N(s_*, x_*, m_*)$ has an oscillatory integral kernel over an unbounded interval. As $x_*$ and $m_*$ become large, the rapidly oscillating integrand could result in unstable numerical integration. Using current methods known in the art, the integrand can be separated into two parts: one dealing with its asymptote a $s_*^{-1}\xi_*^2 \to \infty$, the integral of which can be expressed in closed-form; the other being the difference between the integrand and the asymptote, which reduces to zero faster and thus can be numerically treated more effectively. Alternate methods use a function to fit $H_1(s_*, \xi_*)$. The fitting function is chosen in such a way that it can be integrated analytically.

Figure 8:
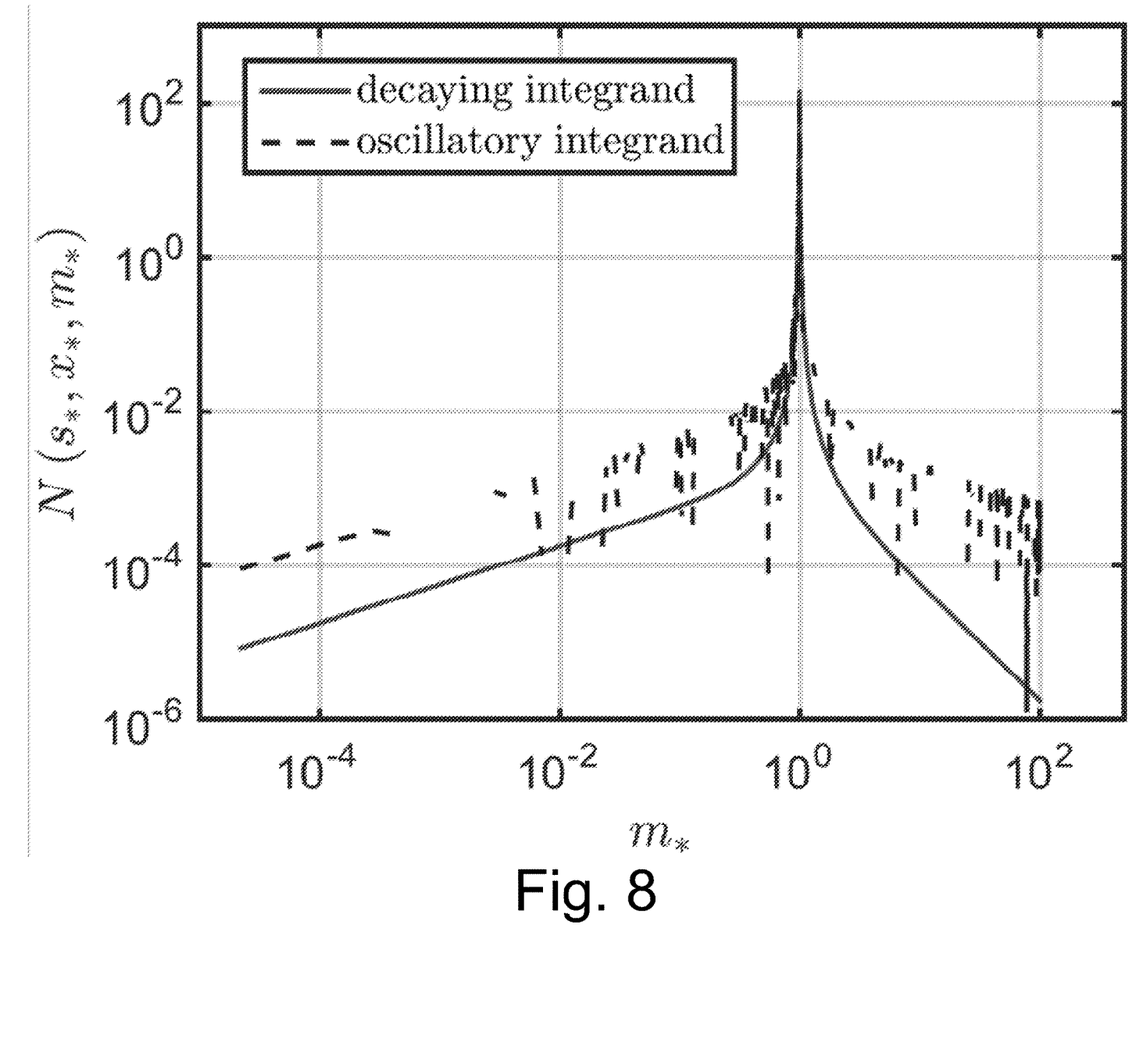
FIG. 8 is a graph of a comparison between direct numerical integration of an oscillatory kernel and the alternative expression using an exemplary embodiment of the present disclosure.

In some embodiments of the present disclosure, a different approach over known methods can be adopted by providing an alternative integral expression for $N(s_*, x_*, m_*)$. The expression for $N(s_*, x_*, m_*)$ can be rewritten using one of the integral representations of the modified Struve functions, in which the oscillatory nature can be removed. A comparison between direct numerical integration of the oscillatory kernel and the alternative expression using the modified Struve functions for $N(s_*, x_*, m_*)$ at $x_*=1$, $s_*=5,000$ and $500,000$ are shown in FIG. 8, wherein $m_*$ is a scaled radius on the surface. The results in both cases are obtained by directly using the "integral" command in MATLAB®, or any other such software able to perform such operations. Direct integration yields highly oscillatory results at large $s_*$ (small $t_*$) and fails to capture the Dirac function behavior at $m_*=x_*$, which is expected for $N(s_*, x_*, m_*)$ at large $s_*$. In contrast, the alternative expression with the modified Struve functions is well behaved and approaches $\delta(m_*-x_*)$ at large $s_*$.

Using the alternative expression for $N(s_*, x_*, m_*)$, an analytical expression for $M(s_*, x_*)$ consisting of special functions such as the hypergeometric functions can also be obtained. It is worth noting that evaluation of function $M(s_*, x_*)$ through direct numerical integration of the alternative expression for $N(s_*, x_*, m_*)$ is also effective as long as sufficient integration points are added in the vicinity of the peak in $N(s_*, x_*, m_*)$.

Finally, to solve for $\bar{\theta}_1(s_*, x_*)$ in Eq. 12, a method of successive substitution can be adopted. Compared with the quadrature method, which was used in the previous literature and known in the art, the method of successive substitution overcomes the in-accuracy issue at large $x_*$.

After solving the field variables in the Laplace domain, the solutions in the time domain can be obtained by using the numerical inversion algorithm of Stehfest, found in Stefest, H. 1970. "Algorithm 368: Numerical inversion of Laplace transforms". *Commun. ACM.* 13(1): 47-49.

The normal stress on the contact surface ($z=0$) can be expressed as, $$\sigma_z = \frac{2G(2\eta-1)}{\pi\eta}\frac{a}{R}\left[\begin{array}{c} 2(1-r_*^2)^{\frac{1}{2}} + \theta_1(t_*,1)(1-r_*^2)^{-\frac{1}{2}} - \\ \int_{r_*}^1 \theta_3(t_*,x_*)(x_*^2-r_*^2)^{-\frac{1}{2}}dx_* \end{array}\right] \quad (13)$$

where, $$\theta_1(t_*, x_*) = \mathcal{L}^{-1}\left[s_*^{-1}x_*^{\frac{1}{2}}\bar{\theta}_1(s_*, x_*)\right]$$

$$\theta_3(t_*, x_*) = \frac{\partial \theta_1(t_*, x_*)}{\partial x_*}$$

and $\mathcal{L}^{-1}$ is the Laplace inversion operator.

It is interesting to note that the ratio between the small- and large-time asymptotes for $\sigma_z=0$ is, $$\left.\frac{\lim_{t \to 0} \sigma_z}{\lim_{t \to \infty} \sigma_z}\right|_{z=0} = \frac{2\eta}{(2\eta-1)\phi} = 1 + \omega \quad (14)$$

Since the contact radius can be assumed to remain fixed in this model, the ratio of the contact pressure is the same as the ratio of the indentation force between the small and large times, namely, $$\frac{F(0)}{F(\infty)} = 1 + \omega \quad (15)$$

where F(t) is the indentation force as a function of time. Indeed, integrating the normal stress over the contact area at $t=0$ and $t \to \infty$, the Hertzian solutions for the indentation force are recovered, $$F(0) = \frac{16Ga^3}{3\phi R}$$

$$F(\infty) = \frac{8G(2\eta-1)a^3}{3\eta R}$$

Figure 3:
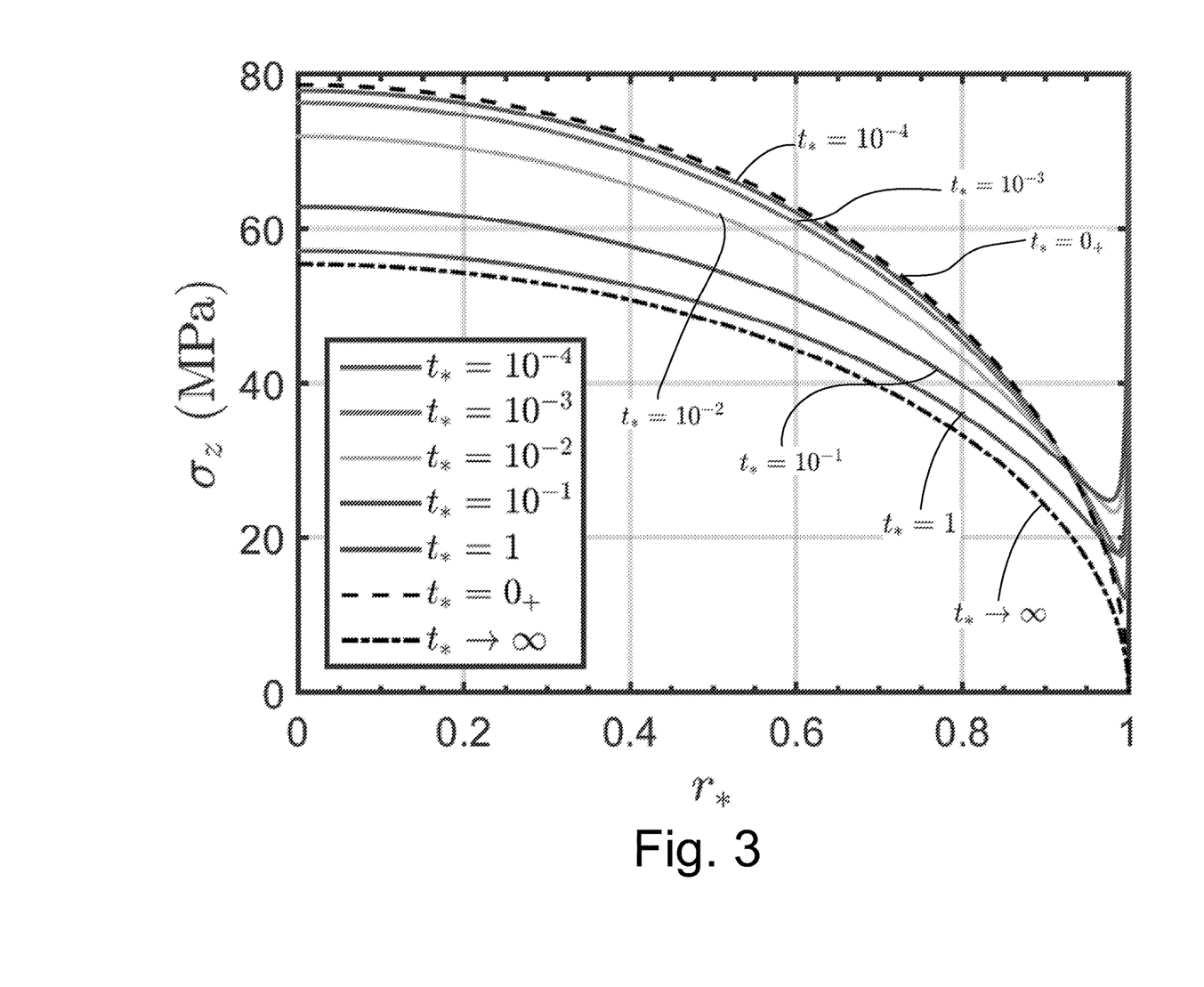
FIG. 3 is a graph of contact pressure at various times for an exemplary embodiment of a method for characterizing poroelastic materials.

Variation of the contact pressure with time is shown in FIG. 3. Overall the poroelastic solution is bounded by the Hertzian solutions at $t=0$ and $t \to \infty$. However, it can be seen from FIG. 3 that at intermediate times, $\sigma_z$ is singular at the contact edge $r_* = 1$. The assumption of a fixed contact radius effectively allows discontinuity and singularity to develop at the contact edge at intermediate times. Hence the solution developed in the present disclosure can be considered equivalent to the case where there is a corner at the contact edge, but the tip of the indenter is spherical.

The results in FIG. 3 are obtained with the radius of the spherical-tip indenter taken as R=50 mm and the indentation depth d=0.1 mm, which correspond to a contact radius of a=2.23 mm. Material properties of the Gulf of Mexico Shale as listed in Cheng, A. H-D. 2016. *Poroelasticity*. Springer-Verlag. Berlin, can be used for this and subsequent calculations. The saturating fluid can be assumed to be water of viscosity $\mu = 1$ cp; skeleton shear modulus is 0.76 GPa; skeleton compression modulus is 1.1 GPa; solid compression modulus is 34 GPa; fluid compression modulus is 2.25 GPa; porosity is 0.3 and permeability is 1e-19 m2.

Indentation force at an intermediate time can be expressed in a normalized form, $$F_n(t_*) = \frac{F(t_*) - F(\infty)}{F(0) - F(\infty)} \quad (16)$$

The explicit expression for $F_n(t_*)$ is, $$F_n(t_*) = \frac{3}{2\omega} \int_0^1 x_*^{1/2} \mathcal{L}^{-1}[s_*^{-1} \theta_1(s_*, x_*)] dx_* \quad (17)$$

Eq. 17 shows that the normalized indentation force is a function of constant $\omega$ only. Note that the dimensionless time is defined as $t_* = tc/a^2$. In principle, the two force asymptotes determine the material constants $G/\phi$, $G(2\eta-1)/\eta$ and the ratio of the two force asymptotes gives constant $\omega$. Once $\omega$ is known, the force relaxation curves in FIG. 6 can serve as the master curves to determine the diffusion coefficient c. However, it is noted that the force-relaxation curve appears to be insensitive to $\omega$. This means that the force-relaxation curve could be a rather reliable mean for determining the diffusivity coefficient c since the uncertainty in $\omega$ does not have a strong effect on the force-relaxation behavior.

The solution procedures for solving Case II and III are similar to that of Case I. The set of equations in Case II for unknowns $A_1$, $A_2$ and $B_1$ is, $$A_1 \xi + A_2 \sqrt{\xi^2 + \lambda} + B_1(1-\phi) = 0$$

$$\eta \lambda A_2 \sqrt{\xi^2 + \lambda} + [\phi + 2\eta(1-\phi)] B_1 \xi^2 = 0$$

The Fredholm integral equation for $\theta_1(s_*, x_*)$ is, $$\theta_1(s_*, x_*) + \omega \int_1^\infty N(s_*, x_*, m_*) \theta_1(s_*, m_*) dm_* = \omega M(s_*, x_*)$$

where, $$N(s_*, x_*, m_*) = m_* \int_0^\infty \xi_* H_1(s_*, \xi_*) J_{-\frac{1}{2}}(x_* \xi_*) J_{-\frac{1}{2}}(m_* \xi_*) d\xi_*$$

$$M(s_*, x_*) = \int_0^1 m_*^{-\frac{1}{2}} (1 - m_*^2) N(s_*, x_*, m_*) dm_*$$

$$H_1(s_*, \xi_*) = 1 - 2 s_*^{-1} \xi_*^2 + 2 s_*^{-1} \xi_*^3 (\xi_*^2 + s_*)^{-\frac{1}{2}}$$

Again $B_1$ and $\theta_1$ are connected through an integral.

For Case III, the set of equation now includes one algebraic equation and two Fredholm integral equations, $$A_1 \xi + A_2 \sqrt{\xi^2 + \lambda} + B_1(1-\phi) = 0 \text{ and,}$$

$$\theta_{1a}(s_*, x_*) + \omega \int_1^\infty N_a(s_*, x_*, m_*) \theta_{1a}(s_*, m_*) dm_* +$$

$$\omega \int_1^\infty N_b(s_*, x_*, m_*) \theta_{1b}(s_*, m_*) dm_* = \omega M_a(s_*, x_*)$$

$$\theta_{1b}(s_*, x_*) + \int_1^\infty N_d(s_*, x_*, m_*) \theta_{1a}(s_*, m_*) dm_* -$$

$$\int_1^\infty N_c(s_*, x_*, m_*) \theta_{1b}(s_*, m_*) dm_* = M_b(s_*, x_*) \text{ where,}$$

$$N_a = m_* \int_0^\infty \xi_* H_{1a}(s_*, \xi_*) J_{-\frac{1}{2}}(x_* \xi_*) J_{-\frac{1}{2}}(m_* \xi_*) d\xi_*$$

$$N_b = 2 s_*^{-\frac{1}{2}} m_* \int_0^\infty \xi_*^2 H_{1b}(s_*, \xi_*) J_{-\frac{1}{2}}(x_* \xi_*) J_{\frac{1}{2}}(m_* \xi_*) d\xi_*$$

$$N_c = m_* \int_0^\infty \xi_* H_{1b}(s_*, \xi_*) J_{\frac{1}{2}}(x_* \xi_*) J_{\frac{1}{2}}(m_* \xi_*) d\xi_*$$

$$N_d = s_*^{-\frac{1}{2}} m_* \int_0^\infty \xi_*^2 H_{1b}(s_*, \xi_*) J_{\frac{1}{2}}(x_* \xi_*) J_{-\frac{1}{2}}(m_* \xi_*) d\xi_*$$

$$M_a = (s_*, x_*) = \int_0^1 m_*^{-\frac{1}{2}} (1 - m_*^2) N_a(s_*, x_*, m_*) dm_*$$

$$M_b = (s_*, x_*) = \int_0^1 m_*^{-\frac{1}{2}} (1 - m_*^2) N_d(s_*, x_*, m_*) dm_*$$

$$H_{1a}(s_*, \xi_*) = 1 - 2 s_*^{-1} \xi_*^2 + 2 s_*^{-1} \xi_*^3 (\xi_*^2 + s_*)^{-\frac{1}{2}}$$

$$H_{1b}(s_*, \xi_*) = 1 - \xi_* (\xi_*^2 + s_*)^{-\frac{1}{2}}$$

Figure 6:
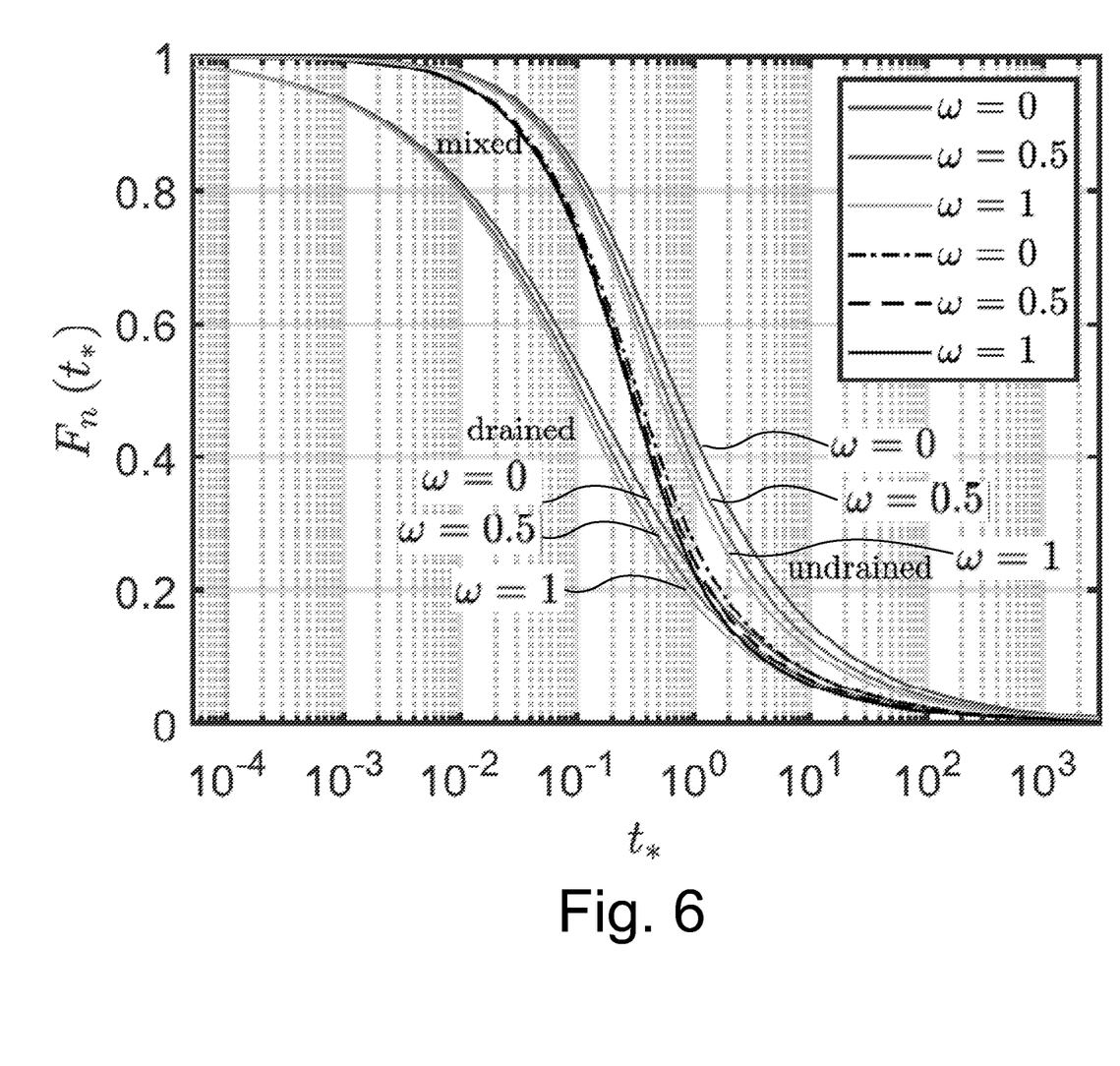
FIG. 6 is a graph of a plurality of master curves for relaxation of normalized indentation force obtained from an exemplary embodiment of a method for characterizing poroelastic materials.

Eq. 17 can also be used to calculate the normalized indentation force for Case II. Replacing $\theta_1(s_*, x_*)$ with $\theta_{1a}(s_*, x_*)$ gives the normalized force relaxation expression for Case III. Summary of the normalized indentation force relaxation for all three cases is shown in FIG. 6.

Figure 4:
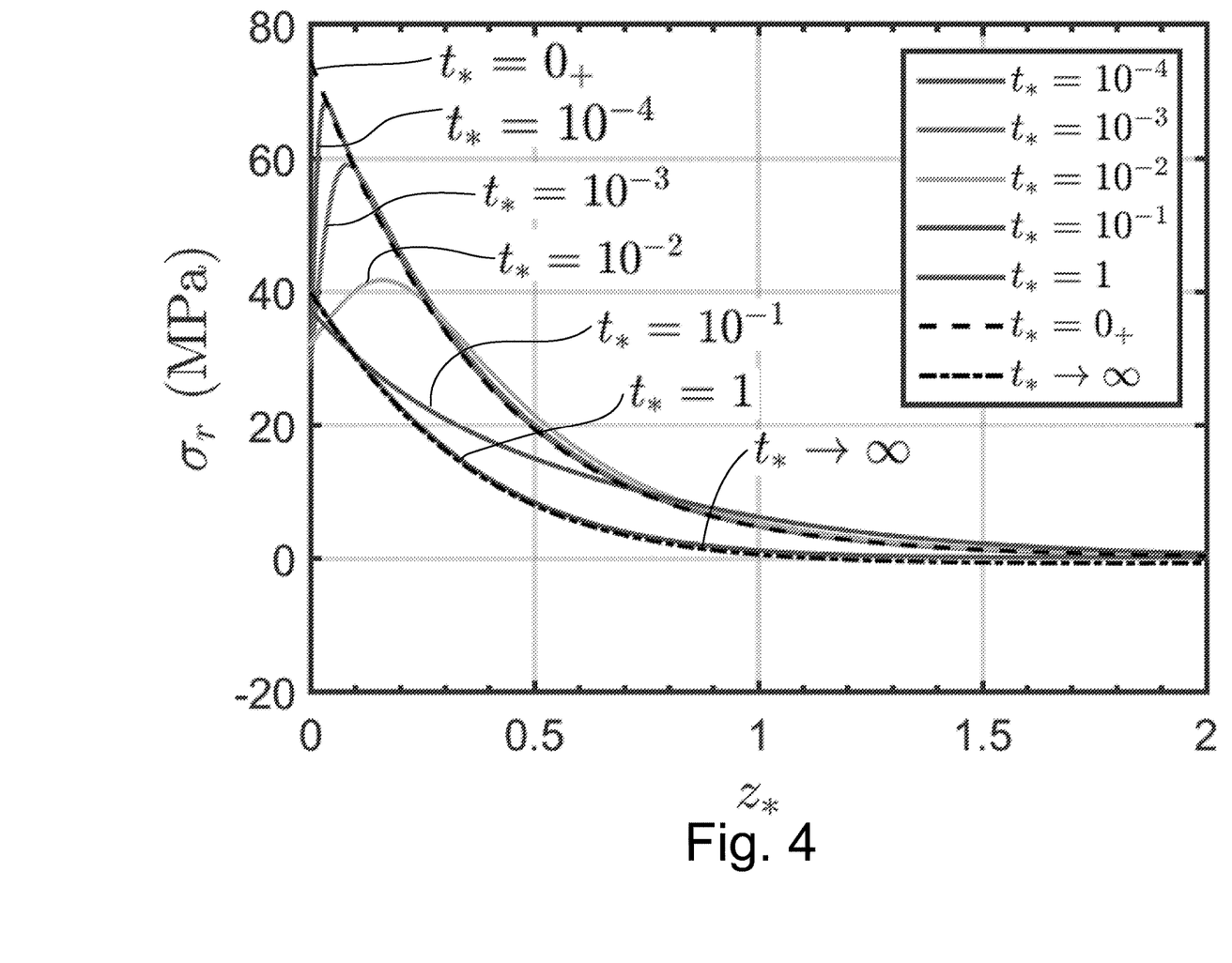
FIG. 4 is a graph of radial stress at dimensionless times for an exemplary embodiment of a method for characterizing poroelastic materials.
Figure 5:
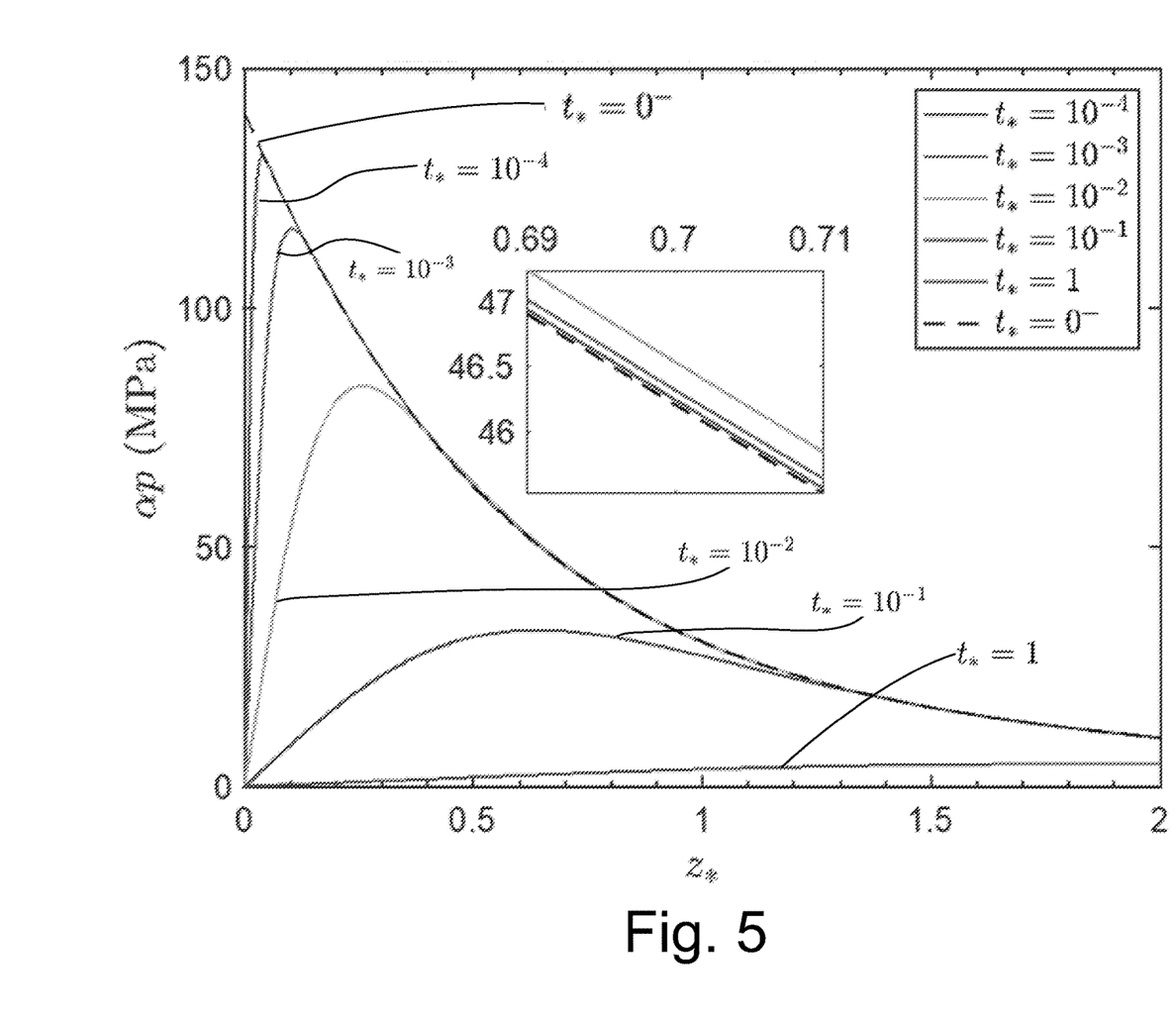
FIG. 5 is a graph of distribution of pore pressure at dimensionless times for an exemplary embodiment of a method for characterizing poroelastic materials.

Variation of the radial stress with depth at intermediate time is in fact non-monotonic, see FIG. 4. Since a drained boundary is assumed on the surface, the radial stress on the surface drops almost instantaneously from the undrained asymptote to a value slightly below the drained asymptote. Meanwhile, the pore pressure distribution along the depth shows the Mandel-Cryer effect, where the pore pressure rises above the initial value at $t_* = 0^+$ before its dissipation, as shown in FIG. 5.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
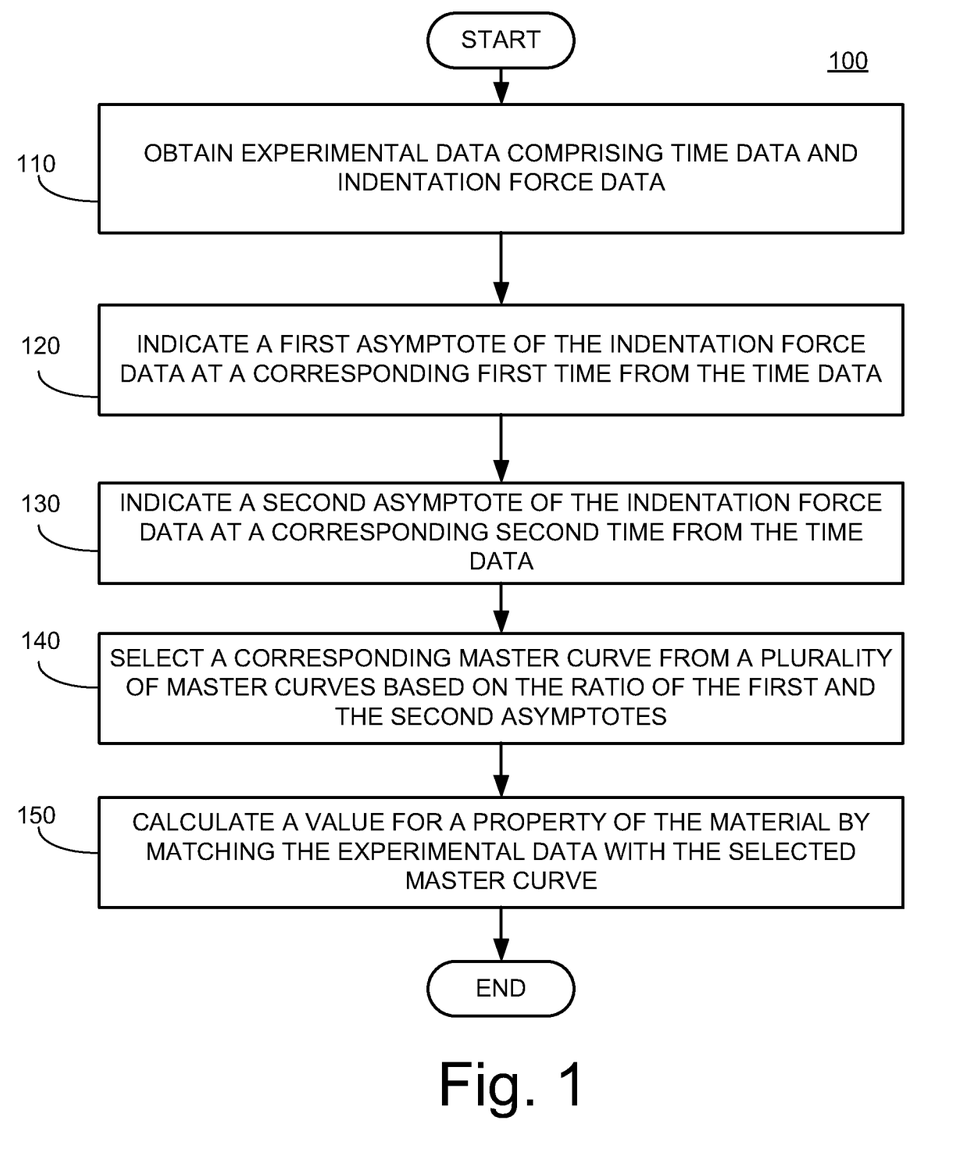
FIG. 1 is a flowchart of an exemplary embodiment of a method for characterizing poroelastic materials.
Figure 2:
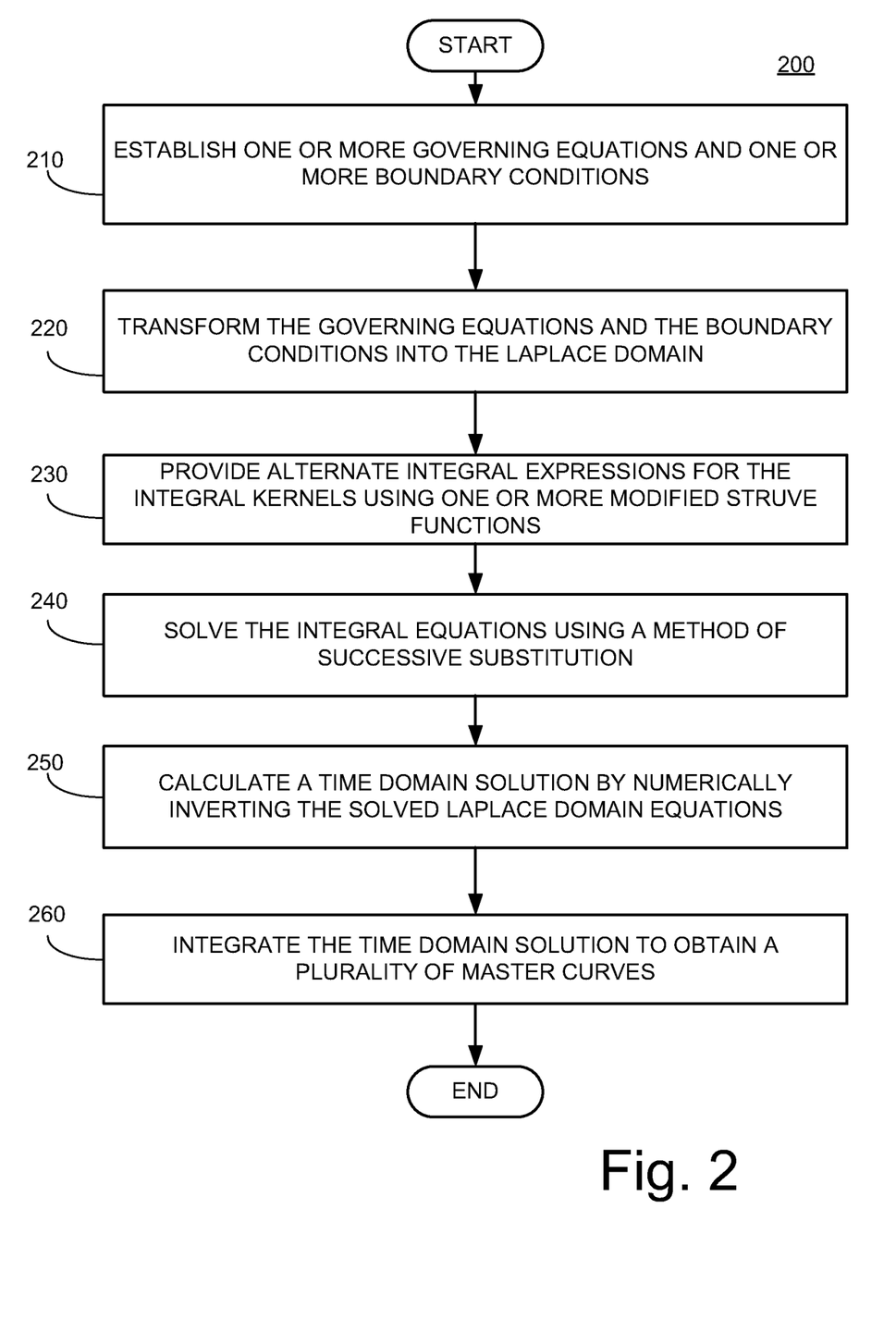
FIG. 2 is a flowchart of an exemplary embodiment of a method for characterizing poroelastic materials.

FIGS. 1-2 and 10 illustrate exemplary embodiments of the presently disclosed systems and methods for characterizing poroelastic materials.

In FIG. 1, a method 100 for characterizing poroelastic materials is disclosed herein. In block 110, experimental data can be obtained from a material test, comprising at least time data and indentation force data. In some embodiments, the experimental data can be obtained using an indentation tool configured to indent a material to a predetermined depth. The indentation tool can comprise a spherical indenter in the form of a rigid sphere. For example, the indenter can be a rigid smooth sphere. Additionally, the state of the indenter can be permeable or impermeable.

In some embodiments, the experimental data can be obtained through one or more force sensors (e.g., two or more, three or more, four or more, or five or more). For example, a force sensor can be housed in the indentation tool to measure the force applied to the material. Additional force sensors can be attached to the system in any configuration such that the applied force to the material can be obtained from the sensors. In some embodiments, the force sensors can be connected to one or more storage devices (e.g., two or more, three or more, four or more, or five or more). Suitable examples of a storage device can include, but are not limited to, hard drives, hard disks, solid-state drives, removable universal serial bus (USB) drives, floppy disks, compact disks (CDs) and the like. The one or more storage devices can be configured to store the experimental data, along with other data. It is understood that the storage devices can store more than the experimental data.

In some embodiments, the one or more force sensors, the indentation tool, and/or the one or more storage devices can be connected to one or more processors (e.g., two or more, three or more, four or more, or five or more). The one or more processors can be configured to execute instructions given to the system. For example, the one or more processors can be configured to cause the indentation tool to indent the material and can cause the one or more storage devices to begin recording the experimental data received from the one or more force sensors. Additionally, the system can comprise at least one memory configured to store instructions. In some embodiments, the instructions stored on the at least one memory can be executed by the one or more processors. For example, the presently disclosed method steps can be stored in the memory and executed by the one or more processors.

In block 120, a first asymptote of the indentation force data can be indicated with a corresponding first time from the time data. In some embodiments, the first time from the time data can be the initial time and correspond with an initial indentation force asymptote. As would be appreciated by one of ordinary skill in the art, the first asymptote of the indentation force data would be the initial force required to indent a material to a predetermined depth. In some embodiments, the indication can be received from the one or more processors. Additionally, the indication can be stored on the one or more storage devices along with the relevant portions of the experimental data.

In block 130, a second asymptote of the indentation force data can be indicated with a corresponding second time from the time data. In some embodiments, the second time from the time data can be the ending time, or termination time of the test. In other words, the second time can be the time tending towards infinity and corresponding with a steady-state indentation force asymptote. As would be appreciated by one of ordinary skill in the art, as force relaxation occurs to hold the indentation tool at the predetermined depth, and as time tends towards infinity, the force required to maintain the tool at the predetermined depth will level-out or reach a steady-state value. This steady-state force value can be taken as the second asymptote. In some embodiments, the indication can be received from the one or more processors. Additionally, the indication can be stored on the one or more storage devices along with the relevant portions of the experimental data.

In block 140, the ratio between the first and the second asymptotes can be calculated and used to select a corresponding master curve from a plurality of master curves. In some embodiments, the ratio between the first and the second asymptotes can be calculated as a constant, where each master curve from the plurality of master curves corresponds to a certain value of the constant. As mentioned above, the ratio of the asymptotes can be the ratio between the initial force required to maintain the indentation depth and the steady-state force required to maintain the indentation depth. In some embodiments, the plurality of master curves can be stored in the one or more storage devices. The calculation of the ratio can be performed by the one or more processors, which can then retrieve the correct corresponding master curve from the one or more storage devices.

In block 150, the selected master curve can be matched with the experimental data to obtain desired material properties. There exist many data regression techniques which can be used to match the experimental data to the selected master curve. In some embodiments, the data matching can be performed by the one or more processors. Once the data matching has been completed, the desired material properties can be calculated for the performed material test. For example, the desired material property can be the coefficient of hydraulic diffusion, hydraulic diffusivity (or coefficient of consolidation for soils), the hardness, the material toughness, and the like. In some embodiments, the calculating can be performed by the one or more processors. Further, the calculated material property values can be stored in the one or more storage devices for later use.

In FIG. 2, a method 200 for constructing master curves for a poroelastic material is disclosed herein. In some embodiments, the master curve construction can be carried out by the one or more processors. Additionally, the one or more processors can receive data input by a user based on the material being tested, such as material properties. In some embodiments, the one or more processors can store the master curves in one or more storage devices after construction. In block 210, one or more governing equations and one or more boundary conditions can be established. In block 220, the boundary conditions and the governing equations can be transformed into the Laplace domain. In block 230, alternate integral expressions can be provided for the integral kernels using one or more modified Struve functions. In block 240, the integral equations can be solved using a method of successive substitution. In block 250, a time domain solution can be calculated by numerically inverting the solved integral equations from the Laplace domain. In block 260, the time domain solutions can be integrated to obtain the plurality of master curves. In some embodiments, the master curves can be normalized to make time dimensionless, and/or to normalize the force between 0 and 1. Suitable examples of calculated master curves can be seen in FIG. 6.

Figure 7:
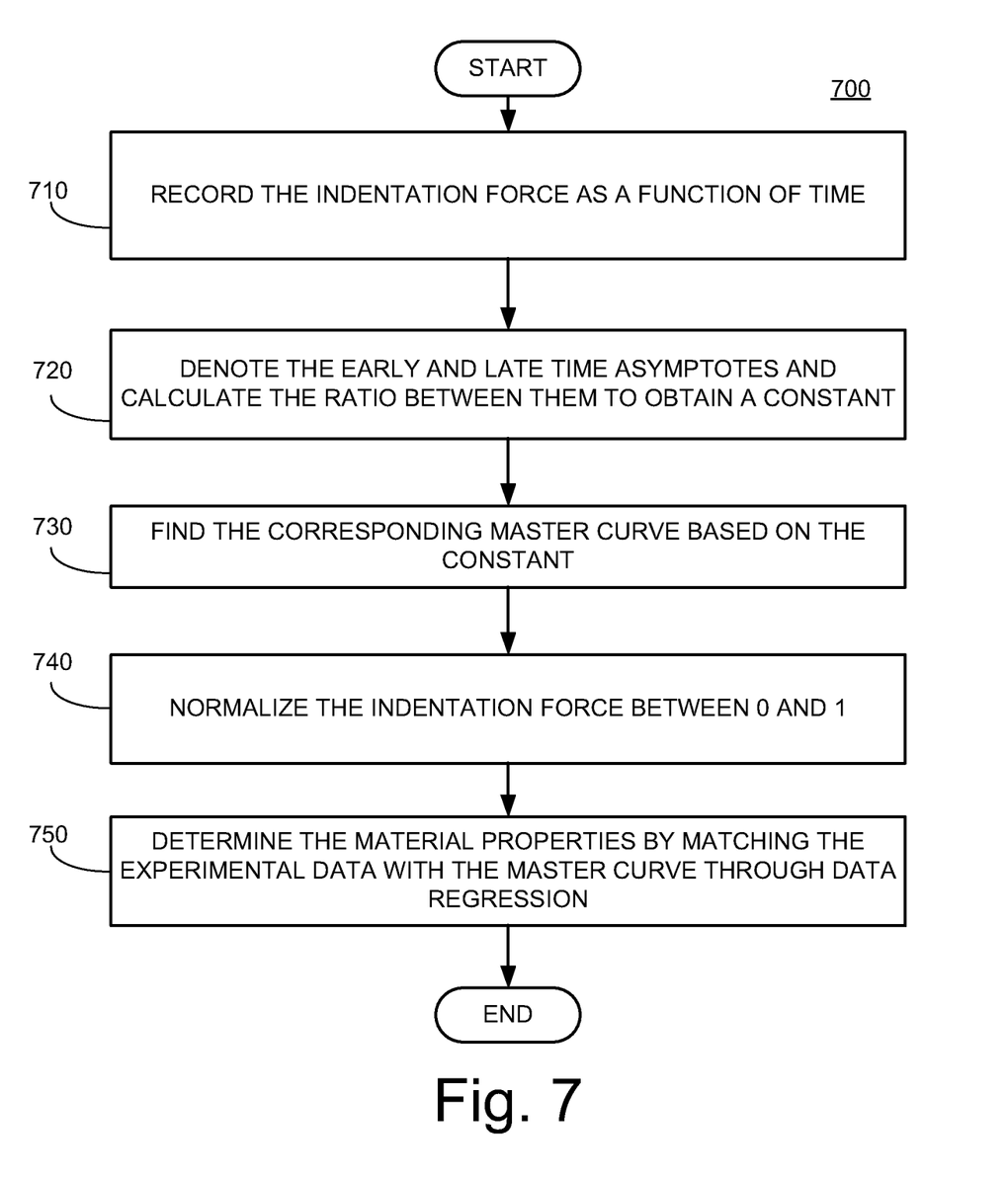
FIG. 7 is a flowchart of an exemplary embodiment of a method for characterizing poroelastic materials.

In FIG. 7, a method 700 for characterizing poroelastic materials is disclosed herein. In block 710, the indentation force can be recorded as a function of time. In some embodiments, the indentation force can form a force relaxation curve. In block 720, the early and late time asymptotes can be denoted. The ratio between the asymptotes can be calculated to obtain a constant. In block 730, based on the constant, a corresponding master curve can be chosen to model the behavior of the material. In block 740, the indentation force can be normalized to be within 0 and 1, inclusive. In block 750, the experimental data can be matched with the corresponding master curve through data regression to obtain the desired material properties.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A method for characterizing a material comprising:
   indenting the material with an indentation tool comprising a spherical indenter in the form of a rigid smooth sphere, the indentation tool configured to obtain indentation force data and time data by a force sensor housed in the indentation tool, the indentation being performed at a predetermined indentation depth;
   recording the indentation force data and the time data obtained by the force sensor;
   selecting a corresponding master curve from a set of theoretical master curves based on a ratio of a first asymptote of the indentation force data and a second asymptote of the indentation force data;
      wherein the indentation force data and the time data are based upon a response of a material to an indentation force over time;
      wherein the first asymptote corresponds to a first time from the time data; and
      wherein the second asymptote corresponds to a second time from the time data; and
   calculating a value for a property of the material by correlating the indentation force data and time data with the corresponding master curve.

2. The method of claim 1
   wherein the material is a poroelastic material; and
   wherein obtaining the indentation force data and the time data comprises:
      indenting over time, with an indentation tool, the poroelastic material to the predetermined indentation depth; and
      measuring a force required to maintain the indentation tool at the predetermined indentation depth.

3. The method of claim 2, wherein the indentation tool is selected from the group consisting of: permeable rigid sphere indenters and impermeable rigid sphere indenters.

4. The method of claim 2, wherein a drainage condition on a surface of the poroelastic material is selected from the group consisting of: a permeable indenter on a fully permeable surface, a permeable/impermeable indenter on a fully impermeable surface, and an impermeable indenter on a fully permeable surface.

5. The method of claim 1, wherein the first time from the time data is an initial time;
   wherein the second time from the time data is an ending time; and
   wherein the indentation force reaches a maximum.

6. The method of claim 1, wherein the property of the material is a coefficient of hydraulic diffusion.

7. The method of claim 1, wherein selecting the corresponding master curve comprises:
   calculating a constant comprising the ratio of the first and the second asymptotes; and
   selecting the corresponding master curve from a theoretical solution corresponding to the value of the constant and a drainage condition on a surface of the material.

8. A method for characterizing poroelastic materials comprising:
   indenting a poroelastic material with an indentation tool comprising a spherical indenter in the form of a rigid smooth sphere, the indentation tool configured to obtain indentation force data and time data by a force sensor housed in the indentation tool, the indentation being performed at a predetermined indentation depth;
   recording the indentation force data and the time data obtained by the force sensor;
   indicating a first asymptote of the indentation force data at a corresponding first time from the time data;
   indicating a second asymptote of the indentation force data at a corresponding second time from the time data;
   selecting a corresponding master curve from a plurality of theoretical master curves based on the ratio of the first and the second asymptotes; and
   calculating a value for a property of the material by matching the experimental data with the corresponding master curve;
   wherein the plurality of master curves is obtained by:
      transforming one or more governing equations using a Hankel transform in the Laplace domain to find expressions for displacement functions in terms of integrals with a number of unknowns;
      transforming one or more boundary conditions to the Laplace domain and matching the boundary conditions with field quantities expressed through the displacement functions to obtain an equation for each of the number of unknowns, which include one or more Fredholm integral equations of the second kind;
      providing alternate integral expressions for integral kernels in the one or more Fredholm integral equations using one or more modified Struve functions;
      solving the one or more Fredholm integral equations using a method of successive substitution;
      calculating a time domain solution by numerically inverting the solved integral equations in the Laplace domain; and
      integrating, based on a plurality of parameters of a specific poroelastic material, the time domain solution to obtain the plurality of master curves representing force relaxation.

9. The method of claim 8, wherein at least one of the governing equations is obtained from a McNamee-Gibson displacement function method.

10. The method of claim 8, wherein at least one of the governing equations comprises one or more material constants.

11. The method of claim 8, wherein one or more field quantities expressed comprise the expressions for the displacement functions.

12. A system for characterizing poroelastic materials comprising:
    an indentation tool comprising a spherical indenter in the form of a rigid smooth sphere and a force sensor housed in the indentation tool;
    one or more force sensors;
    one or more processors; and
    at least one memory storing instructions that when executed by the one or more processors, cause the system to:
       indent, with the indentation tool, a poroelastic material to a predetermined indentation depth to obtain indentation force data and time data;

measure, using the one or more force sensors, a force required to maintain the indentation tool at the predetermined indentation depth to obtain indentation force data;

record experimental data for the poroelastic material, the experimental data comprising at least:
the indentation force data; and
the time data corresponding to the indentation force data;

indicate a first asymptote of the indentation force data at a corresponding first time from the time data;

indicate a second asymptote of the indentation force data at a corresponding second time from the time data;

select a corresponding master curve from a plurality of theoretical master curves based on the ratio of the first and the second asymptotes; and calculate a value for a property of the poroelastic material by matching the experimental data with the corresponding master curve.

13. The method of claim 12, wherein the rigid smooth sphere is selected from the group consisting of: permeable indenters and impermeable indenters.

14. The method of claim 12, wherein a drainage condition on a surface of the poroelastic material is selected from the group consisting of: a permeable indenter on a fully permeable surface, a permeable/impermeable indenter on a fully impermeable surface, and an impermeable indenter on a fully permeable surface.

15. The system of claim 12, wherein the experimental data further comprises at least a force relaxation behavior.

16. The system of claim 12, wherein selecting the corresponding master curve comprises:
calculating a constant comprising the ratio of the first and the second asymptotes; and
selecting the corresponding master curve from a theoretical solution corresponding to the value of the constant and a drainage condition on a surface of the poroelastic material.

17. The system of claim 12, wherein calculating the value of the property of the poroelastic material comprises fitting, using a fitting function predetermined by the full poroelastic solution, the experimental data to the corresponding master curve to obtain the value of the property of the poroelastic material.

18. The system of claim 12, wherein the plurality of master curves is obtained by storing instructions that when executed by the one or more processors, cause the system to:
establish one or more governing equations;
establish one or more boundary conditions using Heaviside step displacement loading;
transform the one or more governing equations using Hankel transform in the Laplace domain to find the expressions for the two displacement functions in terms of integrals with three unknowns;
transform the one or more boundary conditions to the Laplace domain and matching the boundary conditions with the field quantities expressed through the displacement functions to obtain three equations for the three unknowns, which include one or more Fredholm integral equations of the second kind;
provide alternate integral expressions for the integral kernels in the Fredholm integral equations using one or more modified Struve functions;
solve the Fredholm integral equations using a method of successive substitution;
calculate a time domain solution by numerically inverting the solved Laplace domain equation; and
integrate, based on a plurality of parameters of a specific poroelastic material, the time domain solution to obtain a plurality of master curves representing force relaxation.

19. The system of claim 18, wherein the one or more governing equations are obtained from one or more McNamee-Gibson displacement function methods.

20. The system of claim 18, wherein the one or more governing equations comprise one or more material constants.

21. The system of claim 18, wherein the expressions of one or more field quantities comprise the displacement function solutions from the one or more governing equations.

* * * * *